United States Patent [19]
Ushiyama et al.

[11] Patent Number: 5,119,595
[45] Date of Patent: Jun. 9, 1992

[54] LENS GRINDING APPARATUS

[75] Inventors: Kazuo Ushiyama, Akishima; Masaki Watanabe, Hachiooji; Keiji Uchiyama, Tokorozawa; Hisayuki Takei, Hachiooji, all of Japan

[73] Assignee: Olympus Optical Company Limited, Japan

[21] Appl. No.: 541,598

[22] Filed: Jun. 21, 1990

[30] Foreign Application Priority Data

Jul. 10, 1989 [JP] Japan .................... 1-177362

[51] Int. Cl.⁵ .............................................. B24B 13/00
[52] U.S. Cl. ............................. 51/105 LG; 204/129.46; 51/266
[58] Field of Search ......... 51/5 D, 266, 267, 101 LG, 51/105 LG, 106 LG; 125/2; 204/129.46, 241, 225, 217, 224 M, 129.5

[56] References Cited

U.S. PATENT DOCUMENTS

| | | |
|---|---|---|
| 3,043,766 | 7/1962 | Williams .................. 204/129.46 X |
| 3,161,576 | 12/1964 | Teichner .................. 204/129.46 |
| 3,944,475 | 3/1976 | Mizuhara et al. ........... 204/129.46 |
| 4,013,526 | 3/1977 | Inoue ..................... 204/129.46 |

OTHER PUBLICATIONS

"Mirror-Finish Grinding of Glass Materials with Cast-iron Fiber-bond Abrasive", Gazette of Lecture Meeting of Association of Precision Engineering, Autumn Session, Published Oct. 3, 1988.

"Grinding of Silicon by Cast-iron Fiber-bond Abrasive", Gazette of Lecture of Meeting of Association of Precision Engineering, Autumn Session, Published Oct. 5, 1988.

"Electrolytic Dressing Mirror-finish Grinding of glass with Electro-deposited Abrasive", Gazette of Lecture Meeting of Association of Precision Engineering, Spring Session, Published Mar. 22, 1989.

*Primary Examiner*—D. S. Meislin
*Attorney, Agent, or Firm*—Bruce L. Adams; Van C. Wilks

[57] ABSTRACT

A grinding apparatus with electrolytic in-process dressing suitable for grinding a planar or spherical surface. An electrode is provided on the outer peripheral surface of the work holder such that a gap of a predetermined size is left between the electrode and the grinding surface of the grinder. A power supply is connected to apply a voltage between the electrode serving as a cathode and the grinder serving as an anode. A weak-electric coolant is supplied to the space between the grinder and the electrode.

7 Claims, 5 Drawing Sheets

LENS GRINDING APPARATUS

BACKGROUND OF THE INVENTION

1. Field of the Invention

The present invention relates to an electrolytic in-process dressing grinding apparatus suitable for grinding a planar or a spherical surface.

In general, grinding and polishing of a work such as one of an optical material into a spherical form is conducted by means of a tool such as a grinder. A process for processing a spherical surface, as an example of a known grinding operation, will be described with reference to FIG. 7.

FIG. 7 is a schematic illustration of a spherical surface grinding apparatus of the forced-machining type. This type of spherical surface grinding apparatus is disclosed, for example, in Japanese Patent Publication No. 61-33665, as well as in the lens/prism processing technique (Chuo Kagakusha).

Referring to FIG. 7, numeral 1 denotes a work, the surface of which is to be generated at a radius of curvature $R_o$, and held on a work spindle unit by means of a collet chuck. The work spindle unit denoted by 3 is driven by a mechanism (not shown) so as to rotationally drive the work 1 while the work is cut in a direction a'. In order to permit adjustment of wall thickness of the work 1, the work spindle unit 3 is adjustable in the directions of arrows a. Numeral 4 denotes a grinder, while 5 denotes a grinder shaft. A coolant (not shown) is supplied between the work 1 and the grinder 4.

The operation of this grinding apparatus is as follows. It is assumed here that the work 1 is to be ground to have a spherical surface having a radius $R_0$ of curvature as shown in FIG. 8, using the grinder 4 having a grinding radius d. To this end, the grinder shaft 5 is inclined at an angle $\theta_0$ which is given by $\sin \theta_0 = d/2R_0$, and is adjusted by means of a handle (not shown) in a direction b which is perpendicular to the grinder shaft such that the work diameter d coincides with the work axis at a point P, so that a spherical surface having the desired radius of curvature $O_0P = R_0$ is generated. The symbol $O_0$ represents the point where the work axis and the axis of the grinder cross each other at the angle $\theta_0$, i.e., the center of the curvature of the spherical surface to be generated.

As a large number of works are processed, the grinder becomes dull due to clogging, causing problems such as reduction in the grinding power, coarsening of the ground surface of the work and burning.

In order to obviate these problems, it has been a common measure to conduct dressing of the grinder by a dressing tool between successive grinding cycles.

On the other hand, there are many current proposals in this field of technology: such as "Mirror-finish Grinding of Glass materials with Cast-iron Fiber-bond Abrasive" appearing in the first division of Gazzette of Lecture Meeting of Association of Precision Engineering, 1988 Autumn Session (Published on Oct. 3, 1988 by Corporation of the Association of P{precision Engineering), "Grinding of Silicone by Cast-iron Fiber-bond Abrasive" appearing in the third division of Gazzette of Lecture Meeting of Association of Precision Engineering, 1988 Autumn Session (Published on Oct. 5, 1988 by Corporation of the Association of P{precision Engineering), and "Electrolytic Dressing Mirror-finish Grinding of Glass with Electrodeposited Abrasive" appearing in the first division of Gazzette of Lecture Meeting of Association of Precision Engineering, 1989 Spring Session (Published on Mar. 22, 1989 by Corporation of the Association of P{precision Engineering).

FIG. 9(a) is a front elevational view, while FIG. 9(b) is a left side elevational view of a grinding/dressing system illustrative of the principle of dressing operation. In this system, a work 1 is disposed between a rotary table and a grinder which is mounted on a rotary grinder shaft 5. A power supply 12 is connected through a power feed brush 13 to the grinder so that the grinder forms a (+) electrode. A weak-electric coolant is applied between the grinder serving as the (+) electrode and an opposing (−) electrode so that the grinder is ground while being dressed. In this system, the position of the (−) electrode is always fixed with respect to the grinder shaft so as to maintain a constant gap between the (−) electrode and the grinding surface. The gap is adjusted so as to avoid interference between the grinder and the work.

In general, a grinder is progressively worn although the wearing rate varies according to conditions such as the type of the grinder, material of the work and the grinding conditions. The wear of the grinder causes the size of the gap between the grinder and the (−) electrode to be progressively increased so that the dressing effect is impaired.

SUMMARY OF THE INVENTION

Accordingly, an object of the present invention is to provide an electrolytic in-process dressing grinding apparatus which is improved to eliminate any degradation in the electrolytic dressing effect regardless of any change in the length of the grinder due to wear, thereby overcoming the above-described problems of the prior art.

To this end, according to the present invention, there is provided a grinding apparatus comprising: a rotatable work holder for holding a work; a conductive grinder adapted to be driven rotatingly in contact with the surface of the work held by the work holder; an electrode disposed on the outer peripheral surface of the work holder such that a gap of a predetermined size is formed between the grinding surface of the grinder and the electrode in the spark-out period; means for applying a voltage between the grinder and the electrode such that the grinder forms an anode while the electrode forms a cathode; and means for supplying a weak-electric coolant to the space between the grinder and the electrode.

In a preferred form of the present invention, the apparatus further comprises an electrode driving device for driving the electrode back and forth with respect to the work holder, and a control means for controlling the operation of the electrode driving device.

FIG. 1 illustrates the concept of the present invention. Referring to this Figure, a work 1 is held on a work spindle by means of a work holder 2. Numeral 3 denotes a work spindle unit which incorporates a mechanism (not shown) capable of rotatingly driving the work 1 while allowing cutting in a direction indicated by an arrow a'. In order to permit adjustment of thickness of the work 1, the work spindle unit 3 is adjustable by a handle (not shown) in the directions of arrows a.

Numeral 4 denotes a grinder which is made of a material containing grains such as diamond grains bonded with a conductive bond. The grinder 4 is detachably fixed to the grinder shaft 5.

Representing the processing diameter of the grinder 4 by d, the grinder shaft 5 is finely adjusted by about d/2 by a handle (not shown) in a direction perpendicular to the axis of the grinder, whereby the work 1 is ground to present a planar ground surface.

A voltage of (+) polarity is applied to the grinder 4 by a power supply 12 through a power feeding brush 13.

A ring-shaped electrode 10 is detachably secured to the work holder 2 by means of, for example, screws such that a predetermined gap is formed between the electrode 10 and the grinder 4. The ring-shaped electrode 10 is supplied with a voltage of (−) polarity from the power supply 12 through a power feeding brush 11.

A weak-electric coolant 15 is supplied into the space between the electrode 10 and the abutting surfaces of the work 1 and the grinder 4, by means of a hose 14.

As the grinding proceeds, the grinder 4 is progressively worn. In order to compensate for this wear, the work spindle unit 3 is moved in the direction of the arrow a by means of the handle (not shown) for adjusting the work thickness, so that a electrode 10 also is moved in the direction of the arrow a so that the desired positional relationship is maintained between the electrode 10 and the grinder 4, so that the electrolytic dressing effect on the grinder, produced by the electrode 10 and the coolant 15, is never impaired.

BRIEF DESCRIPTION OF THE DRAWINGS

Other objects and advantages of the present invention will become apparent during the following discussion taken in conjunction with the accompanying drawings in which.

DESCRIPTION OF THE PREFERRED EMBODIMENTS

First Embodiment

Figure 1:
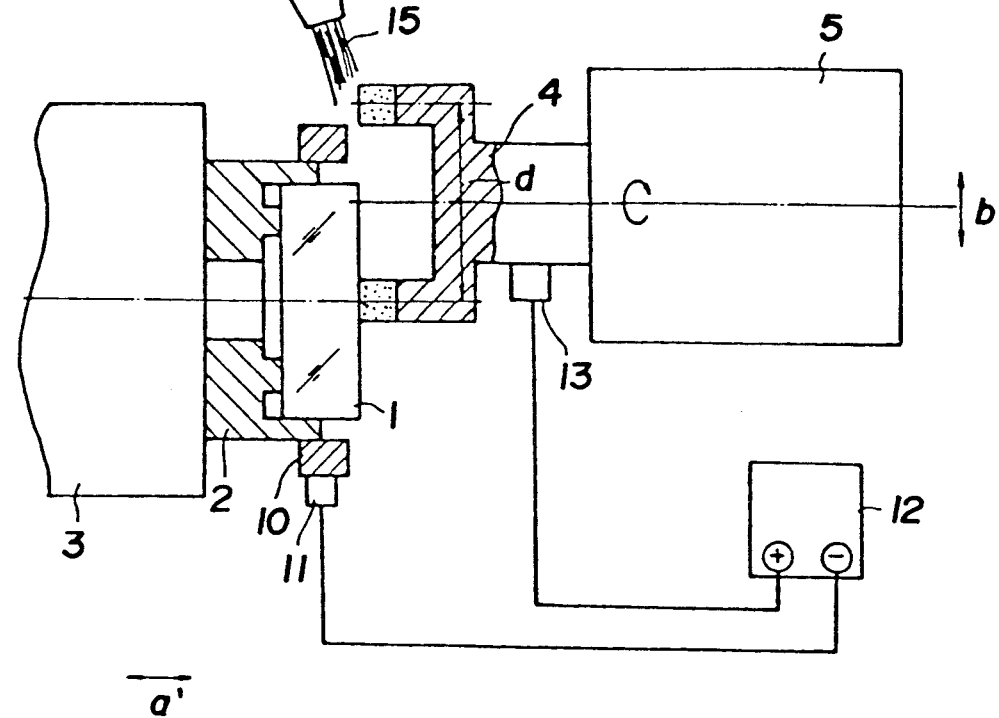
FIG. 1 is a schematic illustration of the basic arrangement of an embodiment of the apparatus in accordance with the present invention, illustrative of the concept of the present invention.
Figure 2:
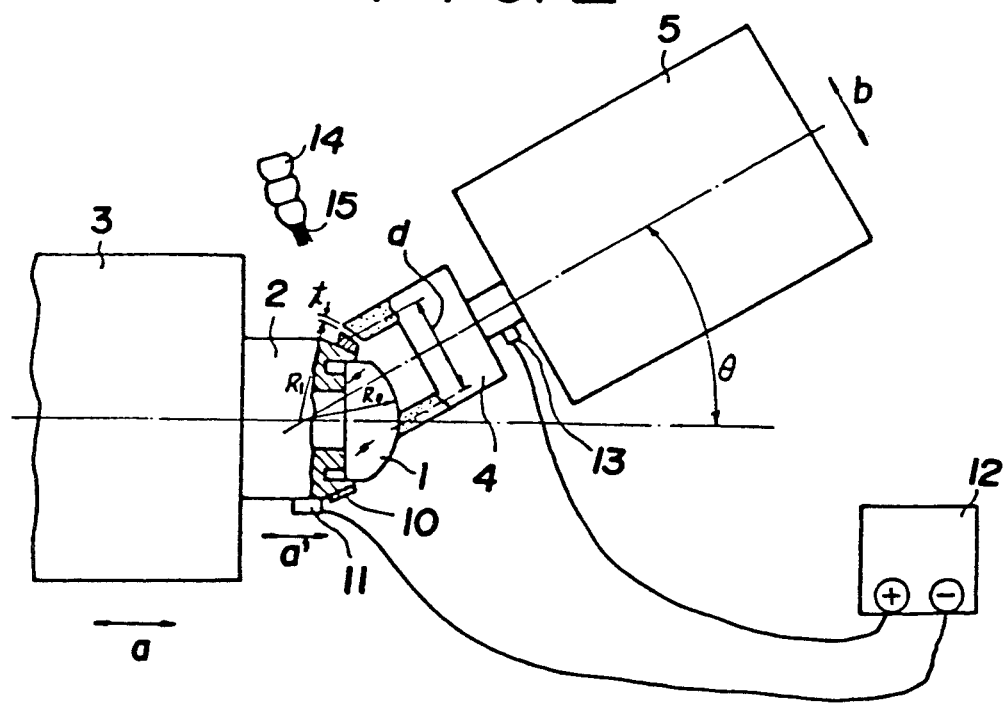
FIG. 2 is a side elevational view of a first embodiment of the grinding apparatus in accordance with the present invention.

Referring to FIG. 2 showing a first embodiment of the grinding apparatus of the present invention, a work 1 which is to be ground to have a spherical surface to be generated at a radius $R_0$ of curvature is held on a work spindle by means of a collet chuck 2.

Numeral 3 denotes a work spindle unit which incorporates a mechanism (not shown) capable of rotatingly driving the work 1 while allowing cutting in a direction indicated by an arrow a'. In order to permit adjustment of thickness of the work 1, the work spindle unit 3 is adjustable by a handle (not shown) in the directions of arrows a.

Numeral 4 denotes a grinder which is made of a material containing grains such as diamond grains bonded with a conductive bond. The grinder 4 is detachably fixed to the grinder shaft 5.

Representing the processing diameter of the grinder 4 by d, the grinder shaft 5 inclined at an angle $\theta$ which is represented by $\theta = \sin^{-1}(d/2R_0)$ and is finely adjusted by about d/2 by a handle (not shown) in a direction perpendicular to the axis of the grinder, whereby the work 1 is ground to present a spherical surface generated at the radius $R_0$ of curvature.

A voltage of (+) polarity is applied to the grinder 4 by a power supply 12 through a power feeding brush 13.

An electrode 10 having an end rounded at a radius $R_1$ of curvature is provided on the collet chuck 2 as the work holder such that a gap t is formed between the grinder 4 and the electrode 10 in the state of spark-out, i.e., in the state in which the cut amount is zero. The electrode 10 is supplied with a voltage of (−) polarity from the power supply 12 through a power feeding brush.

A weak-electric coolant 15 is supplied into the space between the electrode 10 and the abutting surfaces of the work 1 and the grinder 4 by a hose 14.

As the grinding proceeds, the grinder 4 is progressively worn. In order to compensate for this wear, the work spindle unit 3 is moved in the direction of the arrow a by means of the handle (not shown) for adjusting the work thickness, so that the above-mentioned gap t is maintained between the electrode 10 and the grinder 4, whereby the electrolytic dressing effect produced by the electrode 10 and the coolant 15 and exerted on the grinder 4 is maintained without being impaired. Consequently, clogging of the gains is avoided so as to ensure efficient generation of the spherical surface.

Second Embodiment

Figure 3:
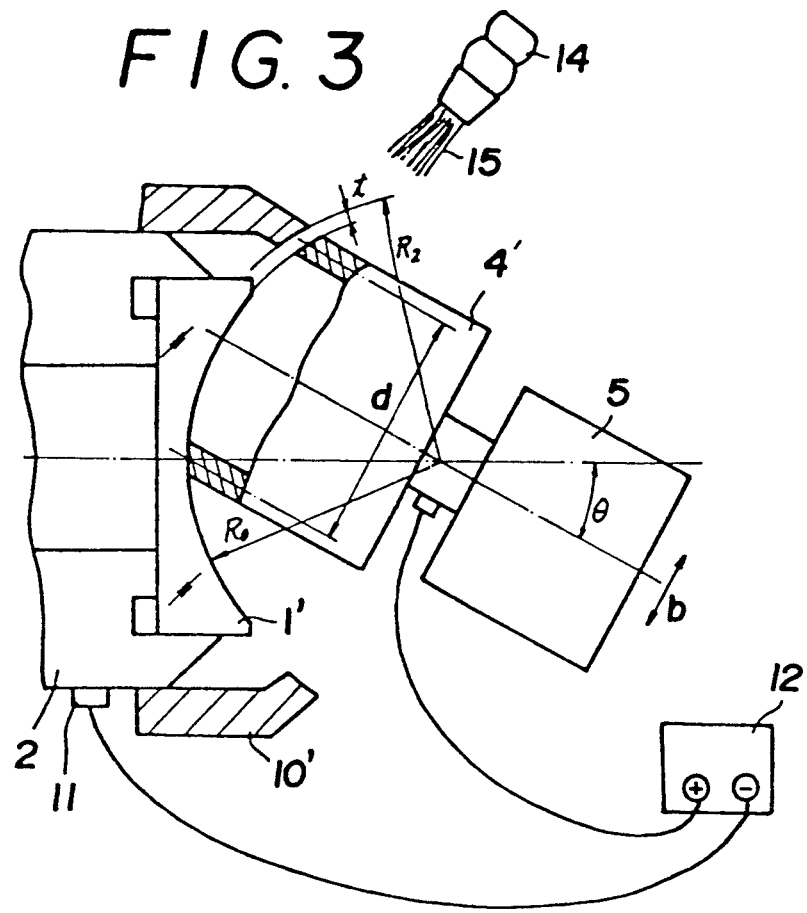
FIG. 3 is a side elevational view of a second embodiment of the grinding apparatus in accordance with the present invention.

FIG. 3 illustrates a second embodiment of the present invention. In this Figure, the same reference numeral denotes the same parts or members as those in the first embodiment. Corresponding parts with modified configurations are designated at the same numerals with dash (').

In thus embodiment, a concaved spherical surface with a radius $R_0$ of curvature is to be generated in the work 1' by means of a grinder 4' having a projected surface capable of generating the concaved spherical surface of the work 1'. The electrode 10' has a substantially U-shaped surface of a radius $R_2$ of the curvature which maintains a gap t between the electrode 10' and the grinder 4' in the spark-out condition. Practically, when the work 1 shown in FIG. 2 is replaced with the work 1' of FIG. 3, the grinder 4 and the electrode 10 also are replaced with the grinder 4' and the electrode 10' so that there is no need for re-adjustment of the gap t when the work is changed, whereby the time for the preparatory operation is shortened.

Third Embodiment

Figure 4:
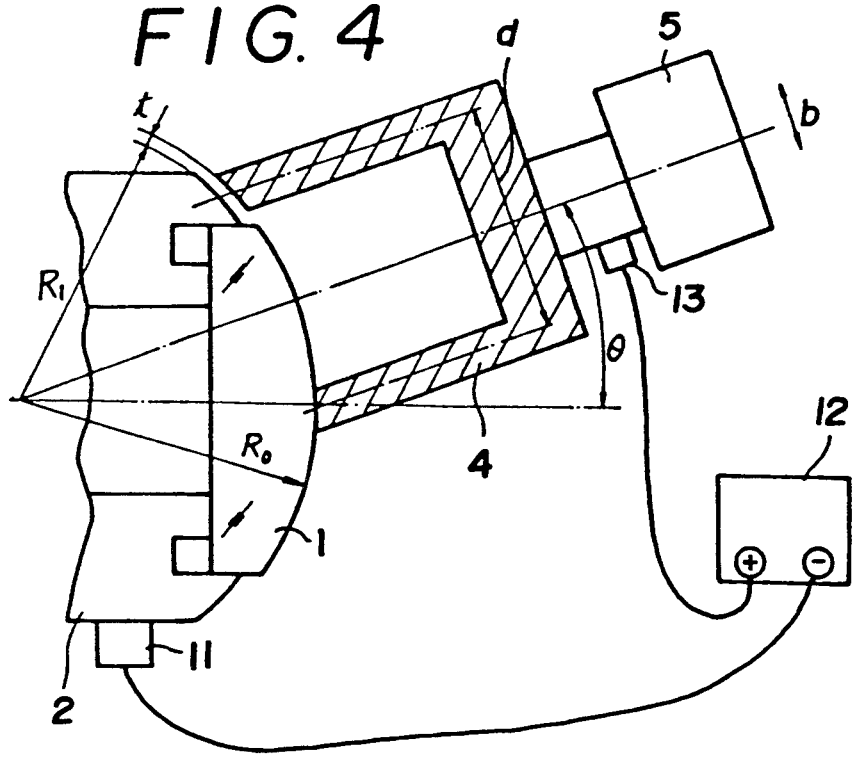
FIG. 4 is a side elevational view of a third embodiment of the grinding apparatus in accordance with the present invention.

FIG. 4 shows a third embodiment of the apparatus in accordance with the present invention in which the same reference numerals are used to denote the same parts or members as those in FIG. 2.

This embodiment is characterized in that the end of the collet chuck 2 is rounded at a radius $R_1$ of curvature so that a gap 1 is formed between the collet chuck 2 and the grinder 4 in the spark-out condition. Thus, in this embodiment, the collet chuck 2 itself is used as an electrode and a voltage of (−)polarity is supplied by a power supply to the collet chuck 2 through a power feeding brush 11.

This embodiment is suitable particularly to the cases where the lens size and the grinder size are small and where no space is available around the collet chuck for installing the electrode.

Fourth Embodiment

Figure 5:
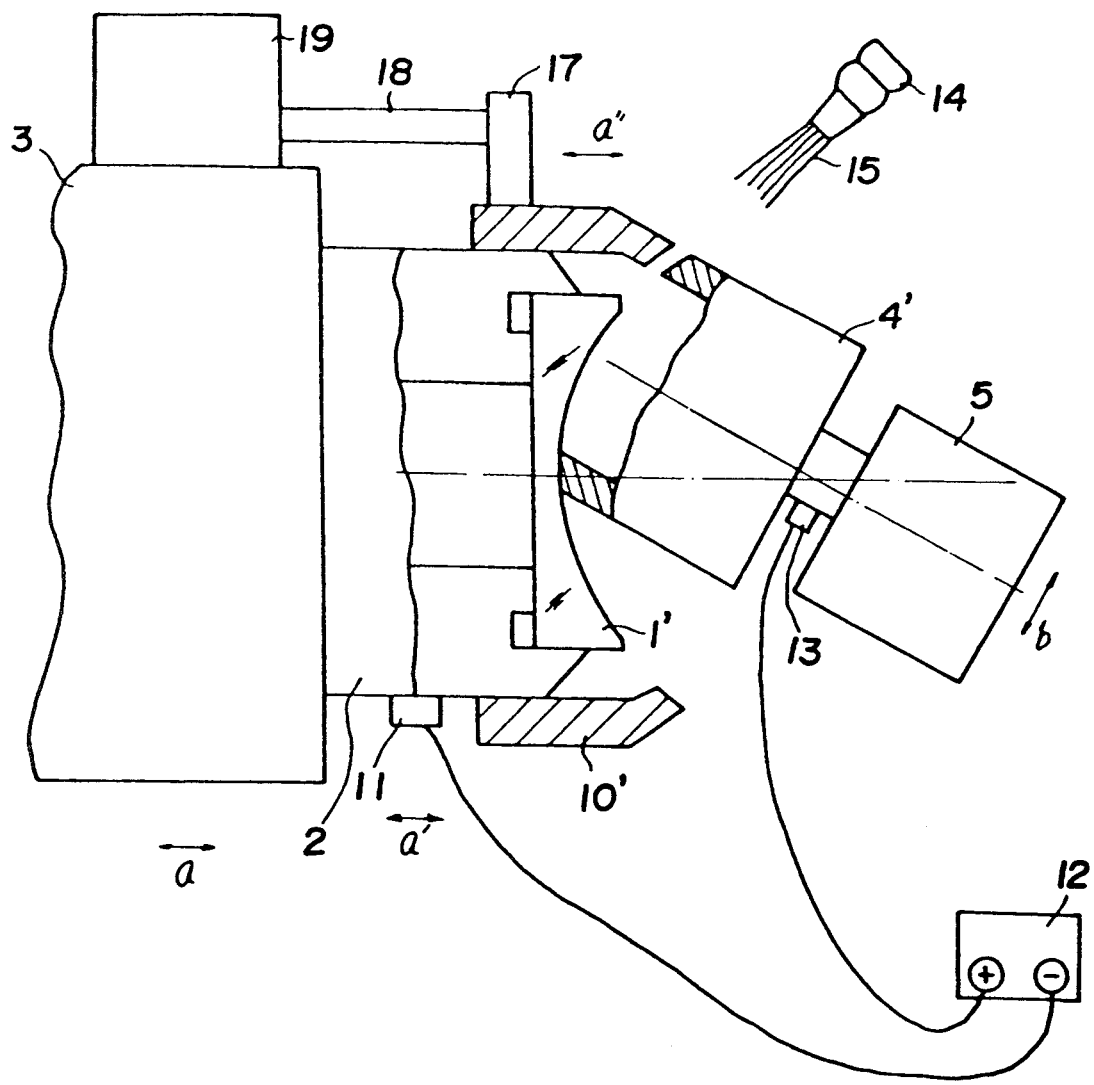
FIG. 5 is a side elevational view of a fourth embodiment of the grinding apparatus in accordance with the present invention.
Figure 6:
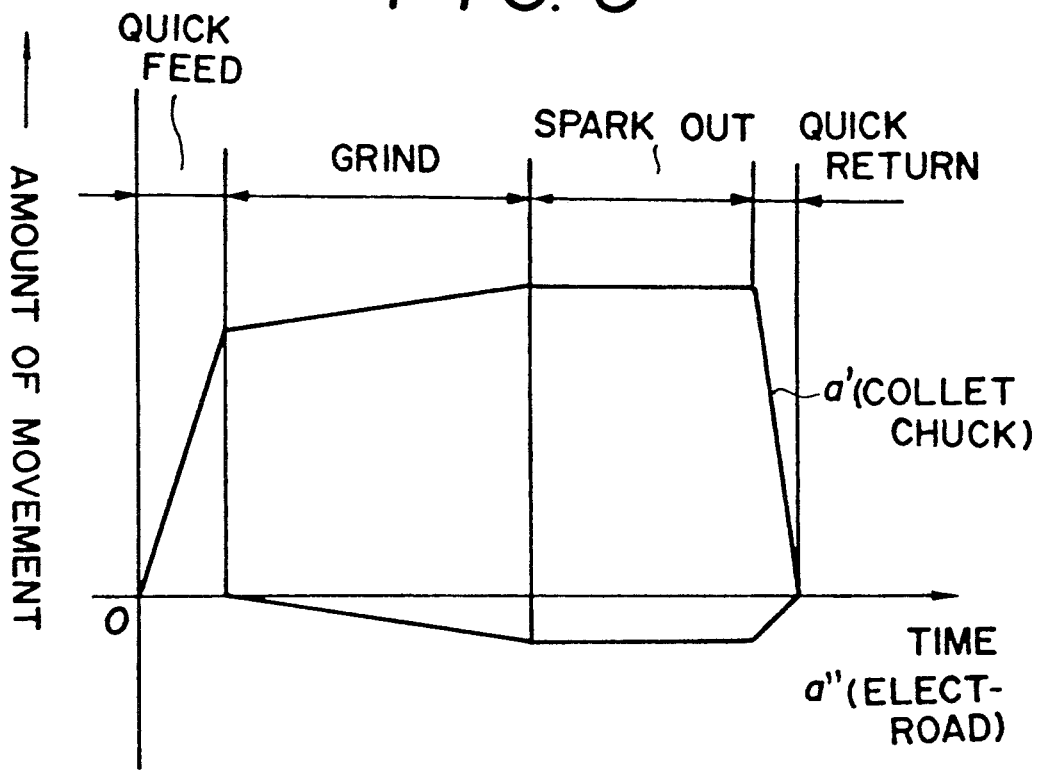
FIG. 6 is a characteristic diagram illustrating the operation of the apparatus shown in FIG. 5.
Figure 7:
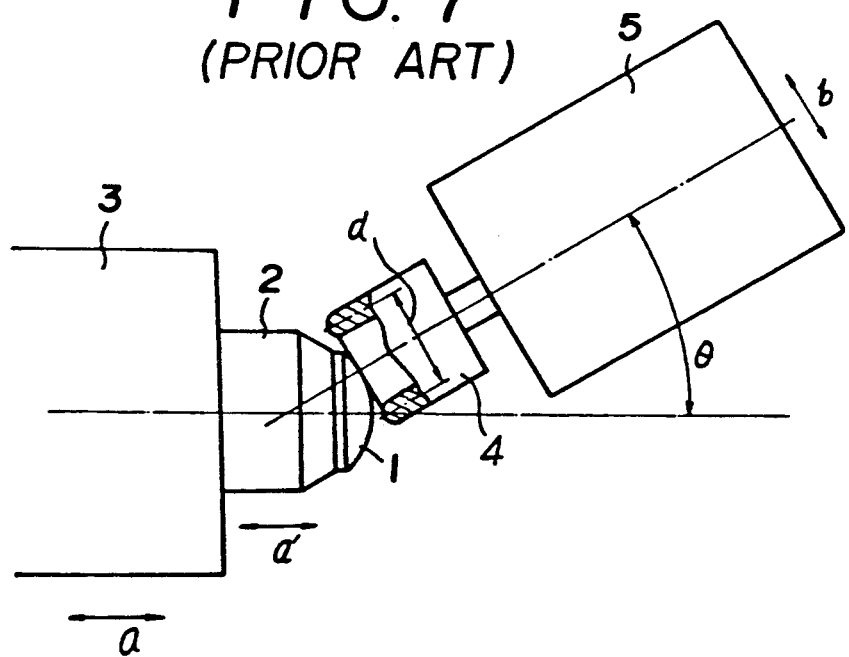
FIGS. 7, 8 and 9(a) and 9(b) are illustrations of known grinding apparatus.
Figure 8:
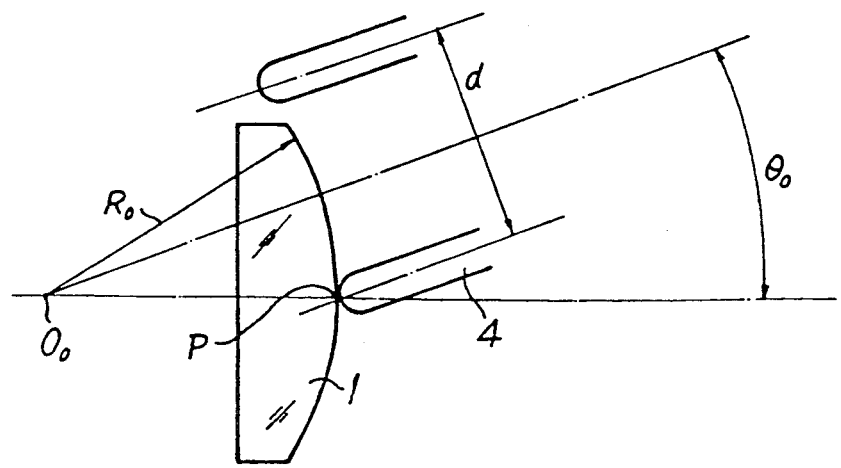
Figure 9A:
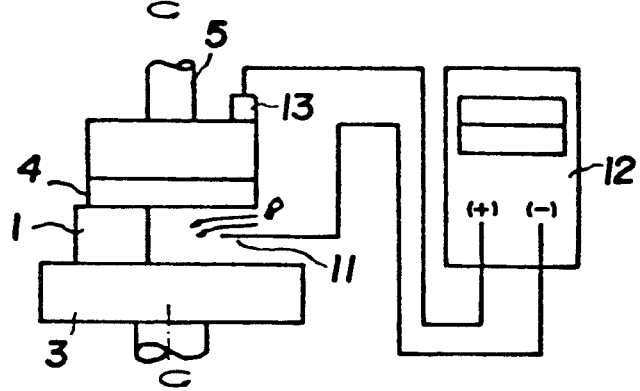
Figure 9B:
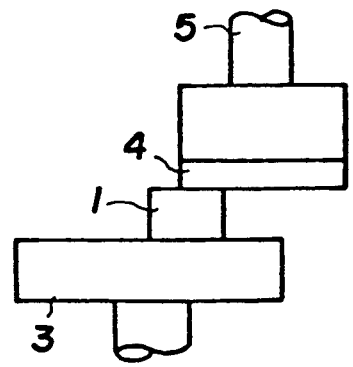

FIGS. 5 and 6 show a fourth embodiment of the present invention in which the same reference numerals are used to denote the same parts or members as those in FIGS. 2 and 3.

This embodiment employs an electrode driving unit 19 provided on the work spindle unit 3 and capable of driving the electrode in the axial direction of the work. The electrode 10' is mounted on the outer peripheral surface of the collet 2 for axial sliding movement thereon. A connecting member 17 is fixed to the outer peripheral surface of the electrode 10'. The connecting member 17 is held by a movable member 18 which is a movable part of the electrode driving unit 19. By the operation of the driving member 19, the electrode 10' is movable in the axial direction of the work relative to the work spindle unit 3 as indicated by an arrow a".

The operation for driving the electrode 10' in the direction of axis of the work a" will be described with reference to FIG. 6. In FIG. 6, the axis of ordinate represents the time from the start until the end of the processing, while the axis of ordinate represents the amounts of movements of the collet chuck 2 and the electrode 10' with respect to the work spindle unit 3. As will be seen from FIG. 6, the collet chuck 2 is controlled in a manner which includes the steps of quick feed in which the collet chuck is fed by a large amount in a short time, gentle feed in which the collet chuck is fed at a small rate to enable the work to be ground bit by bit, a spark out in which the collet chuck is held still without any feed, and a quick return in which the collet chuck is quickly returned to the position at which the processing is commenced. In contrast, the electrode 10' starts to be retracted at a speed proportional to the grinding rate. During the spark out in which the collet chuck is held still, the electrode also is held still without movement. The electrode is then reset to the starting position.

As will be understood from the foregoing description taken in conjunction with FIG. 6, the electrode driving unit 19 is controlled to move in the direction opposite to the direction of movement of the collet chuck in synchronization with the movement of the collet chuck. This control can be effected by any suitable means such as a cam mechanism, an NC system or the like. Such means, however, is omitted because it does not constitute any critical portion of the present invention.

Although the illustrative embodiment of the present invention has been described in detail with reference to the accompanying drawings, it is to be understood that the present invention is not limited to that precise embodiment. Various changes or modifications maybe effected therein by one skilled in the art without departing from the scope or spirit of the present invention.

In the described embodiments, a constant gap is always maintained between the grinder 4 and the electrode 10' during the grinding, so that a constant dressing effect is produced from the beginning until the end of the processing. This advantage is remarkable particular when the amount of cut or grinding is large.

As has been described, according to the present invention, it is possible to conduct grinding with in-process dressing with a constant electrolytic dressing effect regardless of a change in the length of the grinder due to wear.

What is claimed is:

1. A grinding apparatus comprising: a rotatable holder for holding a workpiece; a rotationally driven grinder for contacting the workpiece held by the holder and comprising electrically conductive material; means forming an axially movable electrode on an outer periphery of the holder; means for applying a voltage across the electrode and the grinder; and means for moving the electrode toward and away from the grinder to adjust a gap therebetween.

2. A grinding apparatus according to claim 1, wherein the holder comprises a collet chuck which constitutes the electrode.

3. A grinding apparatus according to claim 1, wherein the means for moving the electrode comprises a spindle connected to the holder.

4. A grinding apparatus comprising: a rotatable work holder for holding a work of optical material; a conductive grinder operative to be driven rotatingly in contact with the surface of the work held by the work holder during a grinding operation; a work spindle having the work holder mounted thereon and mounted to undergo movement toward and away from the grinder to effect grinding of the work; an electrode disposed on an outer peripheral surface of the work holder to form a gap of predetermined size between a grinding surface of the grinder and the electrode in a spark-out period of the grinding operation to enable electrolytic dressing of the grinder means disposing said electrode relative to said grinder to perform the grinding by and dressing of the grinder alternately at successive portions of the grinding surface during each revolution of the grinder; means for applying a voltage between the grinder and the electrode such that the grinder forms an anode while the electrode forms a cathode; and means for supplying a weak-electric coolant to the gap between the grinder and the electrode.

5. A grinding apparatus according to claim 4; further comprising electrode driving means for driving the electrode towards and away from the work holder; and control means for controlling the electrode driving means.

6. A grinding apparatus according to claim 5; wherein the electrode driving means is incorporated in a work spindle unit connected to the work holder for axially moving the same.

7. A grinding apparatus according to claim 4; wherein the work holder comprises a collet chuck which functions as said electrode.

* * * * *